United States Patent [19]
Galemmo et al.

[11] 3,934,156
[45] Jan. 20, 1976

[54] MOVEMENT RESPONSIVE CONTROL APPARATUS

[75] Inventors: Robert A. Galemmo; David S. Wilson; Howard Burman, all of Montreal, Canada

[73] Assignee: Colonial Kinetics, Inc., Leonia, N.J.

[22] Filed: Mar. 18, 1974

[21] Appl. No.: 452,276

[52] U.S. Cl................................ 307/117; 340/258 A
[51] Int. Cl.² ........................................ H01H 36/00
[58] Field of Search ......... 307/116, 117, 13, 18, 29, 307/139, 157; 340/258 A; 315/152, 159, 156, 157, 127; 317/146

[56] References Cited
UNITED STATES PATENTS
3,459,961   8/1965   Ravas.................................. 307/116
3,801,800   4/1974   Newton............................... 307/117

*Primary Examiner*—Robert K. Schaefer
*Assistant Examiner*—M. Ginsburg
*Attorney, Agent, or Firm*—Bain, Gilfillan & Rhodes

[57] ABSTRACT

Apparatus for reducing the consumption of power by controlling the application and removal of power to and from a plurality of load circuits connected to AC power sources of the same or different phases in response to the movement and absence of movement of an object within a prescribed area.

8 Claims, 3 Drawing Figures

MOVEMENT RESPONSIVE CONTROL APPARATUS

BACKGROUND OF THE INVENTION

This invention relates generally to apparatus for reducing the consumption of power by controlling the application and removal of power to loads in response to the movement and absence of movement of an object within a prescribed area.

The conservation of energy in general is of paramount concern to all and the conservation of electrical energy and its attendant conservation of fossil fuel used to produce the electrical energy is becoming more critical and of increasing importance.

Various movement responsive control means are known to the prior art, however, as is known to those skilled in such prior art, such prior art apparatus and systems typically suffer from one or more unwanted or undesirable characteristics. For example, the movement responsive light control means disclosed in U.S. Pat. No. 3,459,961 to Ravas, suffers from the undesirable characteristic of the control or sensing means disclosed therein being able to only control the application and removal of power to loads which must be connected to a power source or power sources of the same phase. Obviously, it is highly desirable for simplicity and economy in the arrangement of controlled loads and in the simplicity of the circuit connection for interconnecting the controlled loads with various sources of power to be able to control and connect such loads to power sources of the same or different phase. Further, economy can be achieved by utilizing a single control circuit or apparatus to control a plurality of loads and to be able to connect such loads to different power sources of the same or different phase with only a single control circuit or apparatus.

The other problem generally inherent to prior art movement responsive control apparatus, particularly movement responsive control apparatus for controlling the application and removal of electrical power to room lights such as tungsten filament lamps is the problem known to those skilled in the art as in-rush current which is caused by the switching current or switching voltage produced in switching the electrical power on and off of the tungsten filament lamps. An attendant problem to the inrush current problems, as is further known to those skilled in the art, is that of electro-magnetic interference caused by the switching current.

SUMMARY OF THE INVENTION

The present invention provides apparatus for reducing the consumption of power by controlling the application and removal of power to and from a plurality of load circuits having a load connected in each circuit, such as for example, room lamps, and most significantly, the apparatus of the present invention provides such control and yet permits the loads in each of the load circuits to be connected to power sources of the same or different phases.

Additionally, the apparatus of the present invention permits the loads in the controlled load circuits to have or be of different power factors.

The phase and power factor advantages are accomplished, inter alia, by providing isolation means which isolate each load circuit from each other and which isolate the load circuits from the sensing means providing the electrical output signals which ultimately control the switching of the load circuits to and from the power sources.

The present invention also overcomes the above-noted in-rush and electro-magnetic interference problem by providing zero current and zero voltage switching.

Additionally, the control apparatus of the present invention may be used most advantageously by being integrated with various security and other energy control systems to enhance or otherwise improve their effectiveness.

DESCRIPTION OF THE DRAWINGS

FIG. 2B illustrates schematically two different embodiments of a power switch or switching means according to the present invention.

DESCRIPTION OF THE INVENTION

Figure 1:
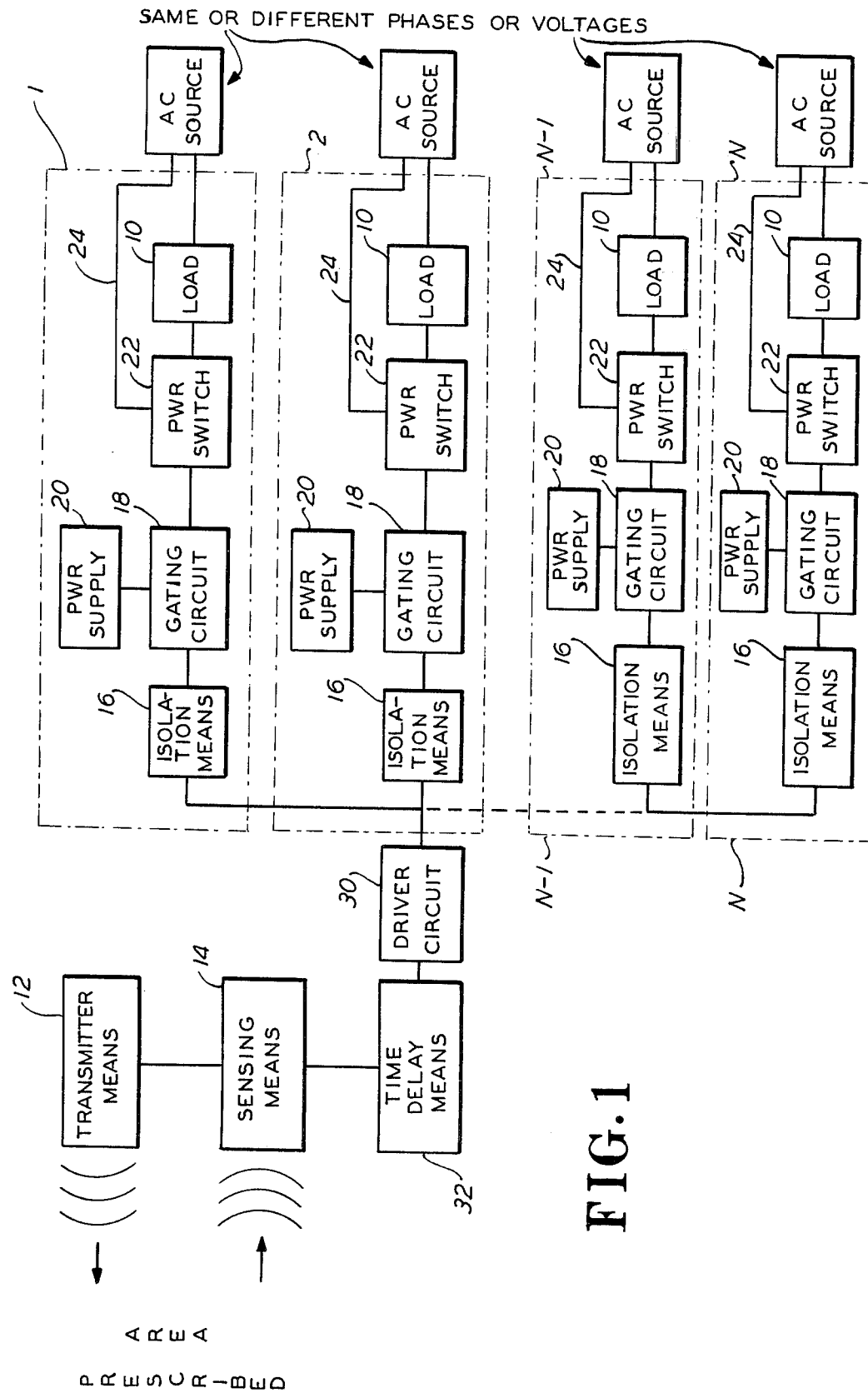
FIG. 1 is a diagrammatic illustration of the present invention.

Referring now to FIG. 1, there are shown apparatus for reducing the consumption of power by controlling the application and removal of power to and from a plurality of load circuits 1, 2, . . . N−1 and N in accordance with the movement and absence of movement of an object within the prescribed area.

Each load circuit may include a load 10 which may be, for example, a room light such as a flourescent lamp or tungsten filament lamp or which may be other electrical energy utilization means or loads, such as for example, a horn used to provide an audible signal in a security or surveillance system.

The apparatus of the present invention may further include transmitter means 12 for producing and transmitting a sound wave having a substantially constant frequency to the prescribed area and sensing means 14 for receiving the sound wave and for producing an electrical output signal in response to a doppler shift in the frequency of the received sound wave caused by movement of the object within the prescribed area.

In accordance with the further teaching of the present invention, each load circuit may be provided with isolation means 16 connected in each of the load circuits intermediate the sensing means 14 and the load 10 and the isolation means 16 isolate each of the load circuits from the sensing means 14 and from each other. The isolation means 16 receives the electrical output signal from the sensing means 14 and produces a gating signal in response thereto.

Further, in accordance with the present invention, each load circuit may include a gating circuit 18 connected intermediate the isolation means 16 and the load 10 and which gating circuit receives the gating signal from the isolation means and produces a switching signal in response thereto. An isolated power supply 20 is provided for each load circuit and provides power for operating the associated gating circuit as well as any other stages or components of each load circuit which may require power for its operation.

Further, in accordance with the present invention, a power switch or switching means 22 is connected in each of the load circuits intermediate the gating circuit 18 and the load and is receiving the switching signal from the gating circuit and in response thereto completing an energization circuit 24 between the load 10 and an AC power source. Upon the removal of the switching signal from the switching means 22 in response to the absence of movement of the object within the prescribed area and in response to the absence of any sensing of any doppler shift in the frequency of the received sound wave by the sensing means 14, the power switch or switching means 22 removes or disconnects the energization circuit 24 between the load 10 and the AC power source at the next time of zero current.

Referring again to the isolation means 16, such isolation means may be comprised of an electrical element providing only unidirectional signal flow, voltage or current, from the sensing means to the load circuit.

Depending upon the signal current required by the number of isolation means 16 included in the apparatus of the present invention, a driver circuit 30 may be provided intermediate the sensing means 14 and the isolation means 16 as a buffer for amplifying the electrical output signal from the sensing means to a predetermined level sufficient to drive the total number of isolation means 16 which may be included in the specific embodiment of the apparatus of the present invention.

Further, the present invention may include time delay means 32 connected intermediate the sensing circuit 14 and the isolation means 16 for providing the electrical output signal from the sensing means to the isolation means and for removing the electrical output signal from the isolation means at a predetermined time after the cessation of movement of the object within the prescribed area causing the doppler shift in the frequency of the received sound wave. Thus, for example, the time delay means 32 may be utilized to turn off room lights a predetermined time after a person has left the room thereby assuring that such person will depart the room before the room lights are turned off by the present invention.

The transmitter means 12 transmits or radiates a substantially constant frequency ultrasonic sound wave in the prescribed area and the ordinary movement of a person or persons in the area, for example even though slight, causes a sufficient doppler shift in the frequency of the sound wave that is detected by the sensing means 14 and the electrical output signal produced in response thereto.

Figure 2A:
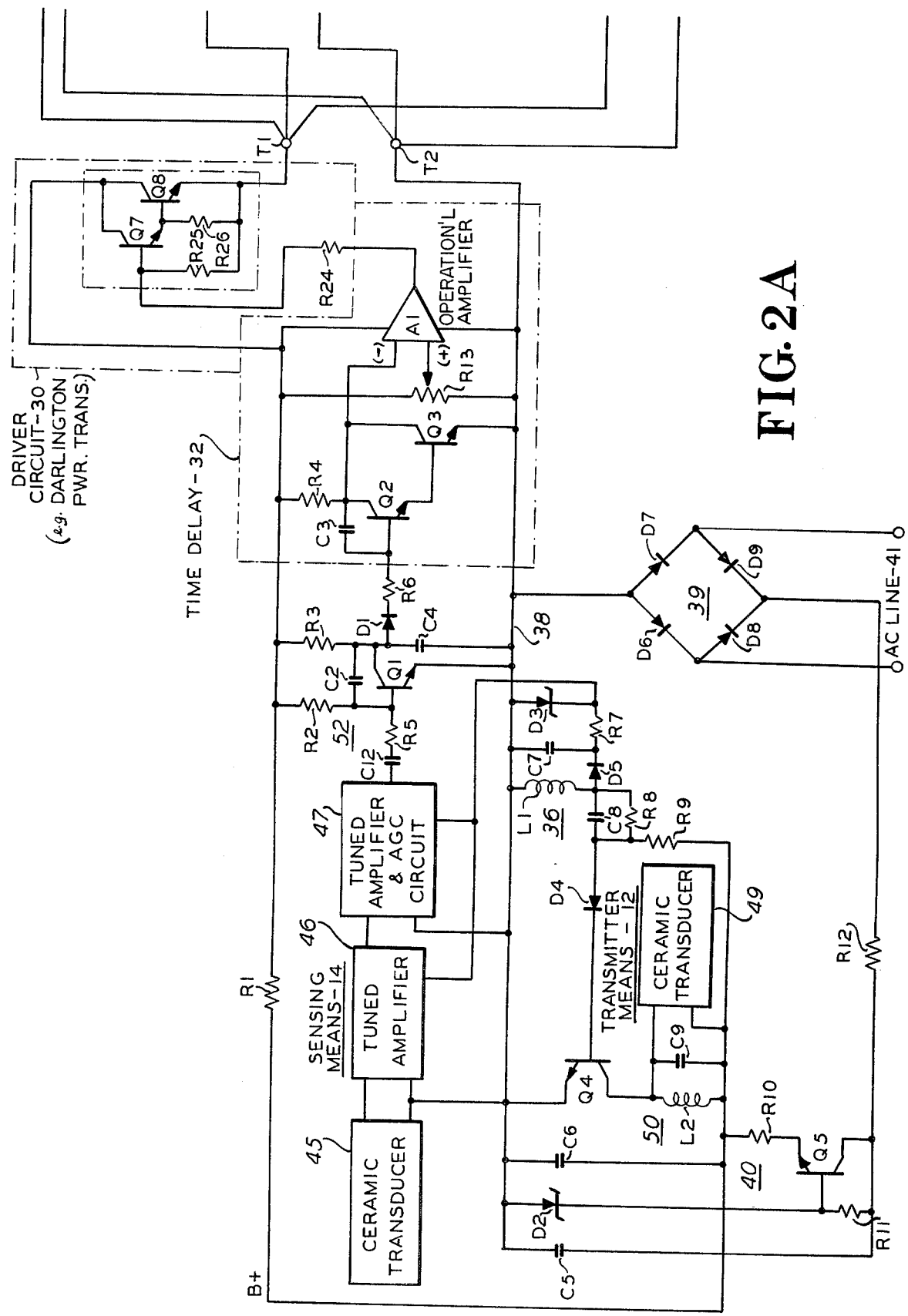
FIGS. 2A and 2B combine to show a schematic illustrating the present invention.
Figure 2B:
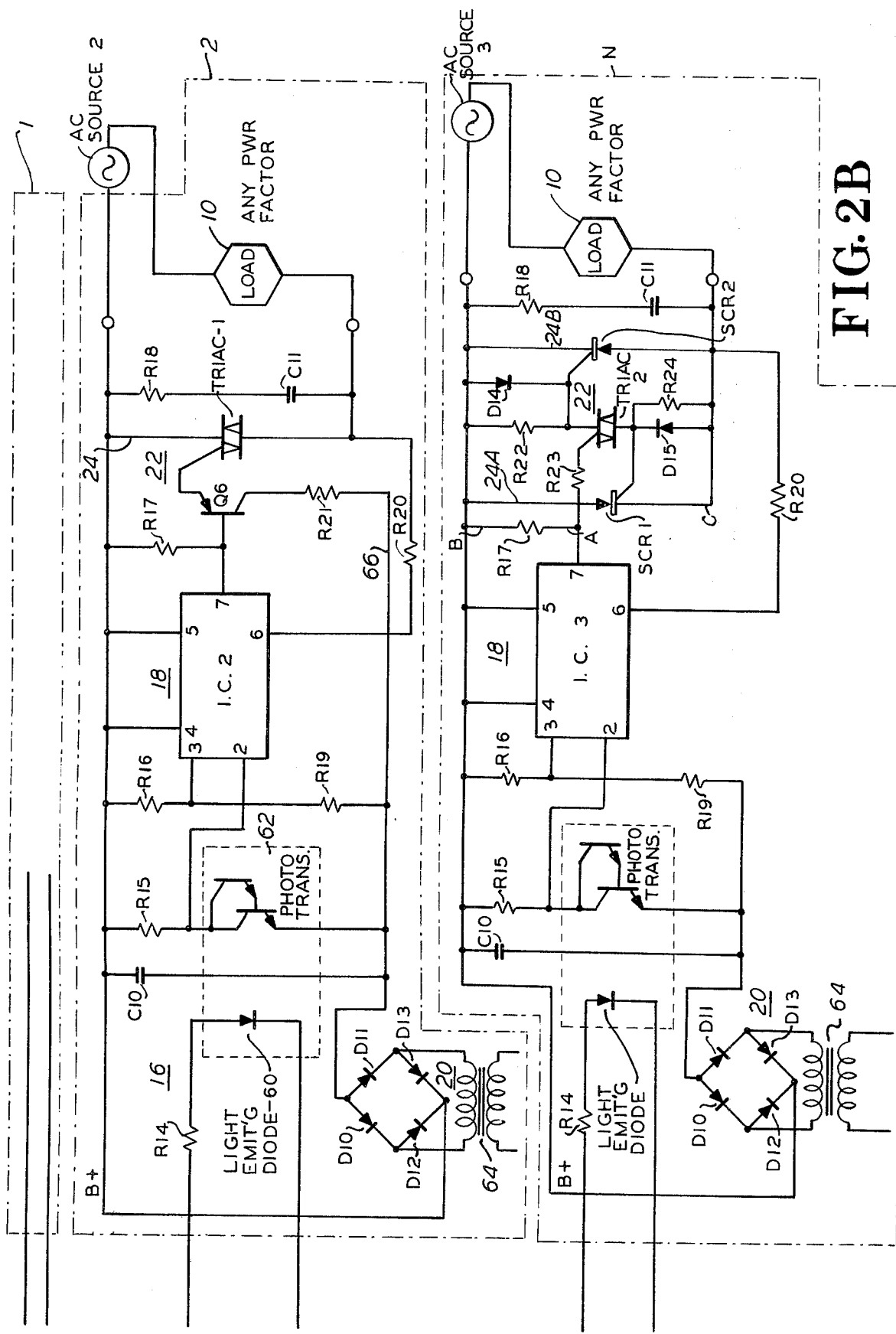

Referring now to combined FIGS. 2A and 2B, apparatus of the present invention is shown in further detail. A power supply 36, common to the stages of the transmitter means 12 and the sensing means 14, is connected across the AC line 41 through a bridge circuit including diodes D6, D7, D8 and D9 and a voltage dropping resistor R12 with the negative point of the bridge circuit being connected to a circuit common or ground line 38.

A DC voltage regulator circuit 40 is provided in the power supply 36 comprising a transistor Q5, a transistor base resistor R11, an emitter resistor R10 and a Zener diode D2 connected between the circuit common 38 and the base of the transistor.

The sensing means 14, the delay circuit 32 and the driver circuit 30 are connected to the power supply 36 for B+ voltage through a resistor R1. A by-pass capacitor C6 is connected between the B+ line and the common line 38.

The power supply 36 further comprises an input filter capacitor C5 connected across the voltage regulator 40, a second regulated low voltage supply comprising a blocking diode D5, a voltage dropping resistor R7, a filter capacitor C7 and a Zener diode D3. Amplifiers 46 and 47 are supplied with low voltage DC from this power supply.

The transmitter means 12 may comprise an ultrasonic frequency oscillator energizing a transmitting device such as a ceramic transducer 49 and may include an ultrasonic oscillator 50 comprising a transistor Q4, a tank circuit consisting of a coil L2 and a capacitor C9 connected in the collector circuit of the transistor, a blocking diode D4 and a grid leak type of arrangement consisting of a resistor R8 and a capacitor C8 in the base circuit of the transistor. The oscillator further includes a coil L1 connecting the base circuit of the transistor to its emitter over the common line 38, and a resistor R9 connecting the B+ supply to the base circuit of the transistor to facilitate oscillator startup. The transducer 49 is connected across the tank circuit. Other suitable oscillator circuits could be used in place of the one disclosed.

The sensing means 14 may comprise a detector circuit 52 including a transistor Q1 with its base connected to the output of the tuned amplifier and AGC circuit 47 through a coupling capacitor C12 and an RF filter resistor R5. The base and the collector of the transistor are connected together through a bypass capacitor C2, the base being further connected to the B+ line by a resistor R2, and the collector connected to B+ through a resistor R3. The emitter of the transistor Q1 is connected directly to the common line 38 while the collector of the transistor is connected to the common line through a capacitor C4. Other suitable detector circuits may be employed since the invention is not limited to the one described.

The time delay means 32 may include two cascaded transistors Q2 and Q3 with the base of the transistor Q2 connected to the collector output of the detector transistor Q1 through a blocking diode D1 and resistor R6. The base of the transistor Q2 is connected to its collector and the collector of the transistor Q3 through an integrating capacitor C3. B+ voltage is supplied to the collector through a resistor R4 while the emitter of the transistor Q3 is connected directly to the common line 38. The time delay means may be variable time delay means for varying the amount of time permitted to elapse, for example, after a person has left the prescribed area. Accordingly, in accordance with the present invention, the time delay means 32 may further include a variable threshold comparator circuit which may comprise an operational amplifier A1 having two inputs (−) and (+). The inverting input (−) is connected to the output of the integrator circuit and the non-inverting input is connected to the variable resistor or voltage divider R13.

The driver circuit 30 may be comprised of a Darlington power transistor circuit connected to the output of the time delay means 32 by the coupling resistor R24 and may include cascaded transistors Q7 and Q8 and resistors R25 and R26 connected as shown.

The electrical output signal provided by the sensing means 14 may be applied through the time delay means 32 and the driver circuit 30, if provided in accordance with the teaching above, to a pair of common terminals T1 and T2 to which the plurality of load circuits 1, 2 . . . N−1 and N may be connected.

With the ultrasonic carrier radiated in the prescribed area, and with no object movement in the area, the carrier is received by the receiving transducer 45, which may also be a ceramic transducer, and converted into electrical energy having the same frequency. The low alternating voltage developed across the coil L1 is rectified by the diode D5, and filtered and regulated respectively by the capacitor C7, resistor R7 and the Zener diode D3. This voltage is applied to the amplifiers 46 and 47 as shown. The carrier frequency is amplified by the two amplifiers 46 and 47, and the amplified carrier is coupled to the detector circuit 52 by the capacitor C12. With no modulation on the carrier, the carrier is by-passed around the detector transistor Q1 by the capacitor C2, which, in combination with the resistor R5, forms an RC circuit having a time constant suitable for such by-pass action.

The capacitor C3 in the time delay circuit 32 charges slowly with a small amount of B+ current flow therethrough and through the base of the transistors Q2 and Q3 to ground. When the capacitor C3 approaches its maximum level of charge, the transistor current flows approach zero.

The collector of the transistor Q1 is held in saturation unless there is some amplitude variation on the carrier signal coupled to the base of the transistor. In that case, collector current pulses are developed and directed to the time delay circuit 32 in a manner presently to be explained.

Thus, with no carrier modulation, the signal to the base of the transistor Q1 is minimal so that its output signal is minimal which is insufficient to cause conduction of the diode D1.

Referring again to combined FIGS. 2A and 2B, in operation with no movement in the prescribed area or area under surveillance, the energization paths 24 are removed or not established so that no power is applied to the loads and hence if the loads are room lamps they would be "off." The diode circuit 39 rectifies the alternating current voltage from the line 38, and the filter capacitor smooths the resulting DC ripple. The Zener diode D2 and the transistor Q5 function together to regulate the direct current (B+) ) voltage with the voltage at the base of the transistor being fixed by the Zener diode so that the transistor circuit functions as an emitter follower circuit.

The oscillator circuit is energized by the regulated B+ voltage with the collector of the transistor Q4 connected thereto through the tank coil L2. Base current therefore is provided through the resistor R9 and the diode D4. The grid leak type arrangement (comprising resistor R8 and capacitor C8) in the base circuit provides current flow through the coil L1 which develops a low alternating voltage thereacross for the low voltage supply.

The electrical values of the tank coil L2 and capacitor C9 are chosen to develop a carrier frequency preferably in the ultrasonic range so that, when radiated, it will not be heard by persons in the prescribed area, i.e. the room or rooms under surveillance. The sound transmitting or radiating transducer 49 is directly energized by the electrical energy developed in the tank circuit, and converts the electrical energy into ultrasonic energy for radiation. The capacitor C6 by-passes any of the carrier frequency energy in the B+ line to ground.

In accordance with the further teaching of the present invention, one alternate embodiment thereof is shown with regard to load circuit 2 of FIG. 2B wherein the isolation means 16 may comprise a uni-directional signal flow electrical apparatus such as for example a photocoupled switch comprising a light emitting diode 60 and a photo-transistor 62. The anode and cathode of the light emitting diode 60 are connected across the common terminals T1 and T2 through resistor R14 and the photo-transistor 62 is positioned opposite the light emitting diode 60 such that the photons or illumination emitting from the light emitting diode upon being energized strikes or falls on the photo-transistor 62 placing it in a state of conduction. The collector of the phototransistor 62 is connected to the B+ line by a coupling resistor R15, B+ being provided by the isolated power supply 20 comprised of the diode bridge D10, D11, D12 and D13 connected by an isolating transformer 64 connected in turn to a suitable power source.

The gating circuit 18 may be comprised by an integrated circuit IC2-7 as shown. Such integrated circuits IC2 may be comprised of a MFC8070 integrated circuit produced by Motorola or a GEL300 integrated circuit produced by the General Electric Company. Input pin 2 of the integrated circuit IC2 is connected to the collector of the photo-transistor 62 of the isolation means 16 and the input pin 3 is connected to a voltage divider network comprised of resistors R16 and R19 connected across the B+ supply; pins 4 and 5 are also connected to the B+ supply as shown.

The power switch or switching means 22 may be comprised of transistor Q6 and triac 1 wherein the gate of the triac is connected to the emitter of the transistor Q6. The switching means 22 is connected to the gating circuit 18 by the base of the transistor Q6 being connected to the pin 7 of the integrated circuit IC2; the base of the transistor Q6 being connected to the B+ by coupling resistor R17 and the collector of the transistor being connected to the ground or circuit common 66 by the coupling resistor R21. One side of the triac 1 is connected to B+ and the other side of the triac is connected to pin 6 of the integrated circuit IC2 by coupling resistor R20. Upon the triac 1 being placed in a state of conduction as described in detail below, the triac completes the energization circuit 24 between the load 10 and the AC source 2. As is known to those skilled in the art, the load circuit may be provided with a snubber circuit, or suppression circuit comprised of a series connection of resistor R18 and capacitor C11.

Alternatively, and in accordance with the further teaching of the present invention, the present invention may be embodied as shown with regard to load circuit N wherein load circuit N may include isolation means 16, gating circuit 18 and isolated power supply 20 as shown and taught above with regard to load circuit 2. Alternatively, the power switch or switching means 22 may comprise SCR1 and SCR2 connected in parallel and in opposite polarity across the load, and may further comprise the series connection of diode D14, triac 2 and diode 15 connected in parallel with the SCR's, as shown; diodes D14 and D15 are connected in opposite polarity as is also shown. The gate of SCR1 is connected to one side of triac 2 at the point of its series connection with diode D15 and the gate of SCR2 is connected to the other side of triac 2 at the point of its series connection with diode D14. It will be noted that relative voltage reference points A, B, and C are provided as shown and that the gate of triac 2 is connected to point A by coupling resistor R23 and that the triac 2 is connected across points B and C by coupling resistors R22 and R24; resistor R17 is connected across points B and A and point C is connected to pin 6 of integrated circuit IC3 by coupling resistor R20.

Upon being placed in a state of conduction as taught in detail below, and upon alternate half cycles of the power from AC source 3, triac 2 alternately places SCR1 and SCR2 in a state of conduction thereby completing alternately energization paths 24A and 24B between the load 10 and the AC source 3 upon such alternate half cycles.

Referring particularly to the isolation means 16 and to the teaching above with regard thereto, the term "isolation" as used in the context of normal or intended operation of the apparatus of the present invention connotes that each load circuit has no interaction or influence on either the sensing circuit or any other load circuit, accordingly, the load circuits may be supplied by a power source, or sources, of the same or different phase. Also, the loads may be of or have any power factor because the switching circuit 22 senses the voltage across the triac and not across the load. Further, it will be understood that the integrated circuits IC2 and IC3 perform zero voltage switching thereby eliminating or rendering negligible in-rush current to the loads (e.g. tungsten filament lamps) and also eliminates or renders negligible electro-magnetic interference.

With no object movement in the prescribed area, no doppler shift in frequency is produced in the received sound wave and hence no electrical output signal is produced by the sensing means 14. Thus, no signal is provided to the base of the time delay transistors Q2 and Q3 (except for the small charging current of the capacitor C3) to cause actuation thereof so that no electrical output signal is provided to the common terminals T1 and T2 and hence the energization paths 24 are not completed and no power is applied to the loads 10.

When an object moves in the predetermined area, e.g. when a person enters the area, the frequency of the sound carrier in the room is modulated by a doppler shift frequency which is received by the receiving transducer 45 and converted into electrical energy with the carrier. The modulated carrier is amplified by the amplifiers 46 and 47, and applies to the detector circuit 52 by the coupling capacitor C12. The modulating or doppler shift frequency is detected by the circuit 52 with the modulation frequency providing a base signal for the transistor Q1. The transistor conducts to provide an output voltage capable of triggering the diode D1 which, in turn, provides a train of voltage pulses across the resistor R6 to the base of the transistors Q2 and Q3 in the delay circuit 32. This causes the transistors to conduct causing current to flow through resistor R4 thereby building up voltage across capacitor C3, with the voltage or potential across capacitor C3 being removed at any time the voltage across the diode D1 exceeds its forward conduction potential. When the voltage across capacitor C3 goes to zero, the negative input of the operational amplifier A1 becomes more negative than the positive input thereby driving the output of the operational amplifier A1 positive toward the positive voltage supply B+. The voltage on the positive input of the operational amplifier is determined by the above-noted variable resistor or voltage divider R13 and it will be understood that the output of the operational amplifer A1 swings, substantially, between ground and the positive voltage supply B+. Upon the output of the operational amplifier A1 swinging to the positive voltage supply B+, an electrical signal or current is applied to the driver circuit 30 which, as noted above, acts as a current buffer to supply voltage or the electrical output signal from the sensing means 14 to the common or output terminals T1 and T2.

With regard to the alternate embodiment of the invention disclosed with regard to load circuit 2 of FIG. 2B, upon the electrical output signal being applied to the terminals T1 and T2 current flows in the light emitting diode 60 causing it to be illuminated and causing such illumination or photons to strike the photo-transistor 62 thereby placing it in a state of conduction; current flow in the light emitting diode 60 is limited to a level within its dissipation rating by the limiting resistor R14.

Upon the phototransistor 62 being placed in a state of conduction, its collector goes low or drops in potential to the voltage level of line 66 thereby providing the gating signal to the gating circuit 18 or integrated circuit IC2 by driving pin 2 low. Gating circuit 18 performs its gating function by examining the voltage appearing at pin 6 and when this voltage goes through zero volts, relative to the voltage at pins 4 and 5, the switching signal is provided at pin 7 which drives the transistor Q6 of the switching circuit 22 to turn it on and thereby through its emitter connection to the gate of triac 1 to turn on or place triac 1 in a state of conduction; as noted above, voltage is fed to pin 6 through coupling resistor R20 which may be referred to as the voltage across the triac 1.

As noted above, upon triac 1 being placed in a state of conduction, the energization circuit 24 is completed between the load 10 and the AC power source 2 whereby energy or power is supplied to the load and, for example, upon the load 10 being a room lamp the room is illuminated in response to the above-noted movement of the object within the prescribed area. Upon the cessation of movement within the prescribed area no electrical output signal is produced by the sensing means 14 and ultimately no switching signal is applied to the gate of triac 1 and hence the triac does not conduct and the energization path 24 is removed or no longer established thereby disconnecting the AC source 2 from the load 10.

As noted above, the time delay circuit 32 delays the removal of the switching signal from the gate of the triac 1 a predetermined amount of time after the cessation of movement within the prescribed area whereby, for example, a person in a room may leave the room in illumination and upon the prescribed area of the room being frequented by an object such as a person, the illumination will remain on continuously.

Referring now to the embodiment of the present invention as disclosed with regard to load circuit N of FIG. 2B, photons or illumination from the light emitting diode striking the photo-transistor will swing the collector of the phototransistor to the negative power supply thereby providing the gating signal to pin 2 of the gating circuit 18 which will operate the integrated circuit IC3 at the next time zero voltage appears on pin 6 which will cause the switching signal to appear at pin 7 or reference point A which point will then become more negative than reference point B thereby biasing the gate of triac 2 and placing it in a state of conduction. Upon point B being more positive than point C, current will flow through diode D14 and triac 2 into the gate of SCR1 turning on SCR1 thereby allowing current to flow from point B to point C and thereby establishing energization path 24A between the load 10 and the AC source 3 thereby applying energy or power to the load 10.

If the gating signal is present at pin 2 of the integrated circuit IC3 at the next half cycle of power from the AC source 3, another switching signal will appear at point A causing triac 2 to remain in the state of conduction thereby allowing current to flow through diode D15 and triac 2 into the gate of SCR2 thereby establishing energization path 24B to complete an energization path between the load 10 and the AC source 3. Upon cessation of movement within the prescribed area, as with regard to the above teaching related to load circuit 2, ultimately no switching signal is applied to the gate of triac 2 and neither of the energization paths 24A and 24B are established and hence power or energy is removed or not applied to the load 10.

It will be understood by those skilled in the art that many modifications and variations may be made in the present invention without departing from the spirit and from the scope thereof.

What is claimed is:

1. Apparatus for reducing the consumption of power by controlling the application and removal of power to and from a plurality of load circuits in response to the movement and absence of movement of an object within a prescribed area, each of said load circuits having a load connected therein and said loads being connectable to AC power sources of different phase, comprising:

transmitter means for producing and transmitting a sound wave having a substantially constant frequency to said area;

sensing means for receiving said sound wave and for producing an electrical output signal at a pair of output terminals in response to a doppler shift in the frequency of the received sound wave caused by said movement of said object within said prescribed area;

a plurality of isolation means connected in parallal to said pair of output terminals, each of said isolation means connected in one of said load circuits intermediate said sensing means and said load connected in each of said load circuits, said isolation means isolating each of said load circuits from said sensing means and from each other, and each of said isolation means receiving said electrical output signal from said sensing means and producing a gating signal in response thereto;

a plurality of signal distribution means, each of said signal distribution means connected intermediate one of said isolation means and said pair of output terminals for evenly distributing said electrical output signal between said plurality of isolation means;

a plurality of gating circuits, each of said gating circuits connected in one of said load circuits intermediate the isolation means and the load connected therein, each of said gating circuits receiving said gating signal and producing a switching signal in response thereto;

a plurality of isolated power supplies, each of said isolated power supplies connected to one of said gating circuits for operating said gating circuit; and a plurality of switching means, each of said switching means connected in one of said load circuits intermediate the gating circuit and the load connected therein, said switching means receiving said switching signal and in response thereto completing an energization circuit between said load and one of said AC power sources, and upon the removal of said switching signal from said switching means, in response to said absence of movement of said object within said prescribed area and in response to the absence of any sensing of any doppler shift in said frequency of the received sound wave by said sensing means, said switching means removing said energization circuit between said load and said one of said AC power sources.

2. Apparatus according to claim 1 wherein each of said isolation means comprises electrical apparatus providing uni-directional signal flow from said sensing means to the load circuit in which the isolation means is connected.

3. Apparatus according to claim 2 wherein said electrical apparatus providing uni-directional signal flow comprises a light emitting diode and a photo-transistor, said light emitting diode receiving said electrical output signal from said sensing means and providing illumination in response thereto and said photo-transistor receiving said illumination and providing said gating signal.

4. Apparatus according to claim 3 wherein with regard to each load circuit, the switching means connected therein comprises a transistor having a base, emitter and collector and a triac connected between the load connected therein and one of said AC power sources, said triac having a gate, the base of said transistor being connected to the gating circuit connected therein, the emitter being connected to said gate of said triac and the collector being connected to the isolated power supply connected therein, said transistor acting as a buffer and receiving a switching signal from said gating circuit and providing predetermined current to said triac sufficient to place said triac in a state of conduction thereby completing an energization circuit between said load and one of said AC power sources.

5. Apparatus according to claim 3 wherein with regard to each of said load circuits the switching means connected therein comprises a pair of SCR's connected in parallel and in opposite polarity across said load connected therein and one of said AC power sources and the switching means further comprises the series connection of a diode, a triac and another diode connected in parallel with said pair of SCR's and with said diodes connected in opposite polarity, the gate of one of said SCR's being connected to one side of said triac at the point of its series connection with one of said diodes and the gate of the other SCR being connected to the other side of said triac at the point of its series connection with the other of said diodes, said connection of said SCR's, diodes and triac being connected between said load and said one of said AC power sources, upon said triac receiving a switching signal from said gating circuit and upon one half cycle of said one of said AC power sources said triac being placed in a state of conduction and providing current to the gate of one of said SCR's thereby turning on said one of said SCR's and completing an energization circuit between said load and said one of said AC power sources, and upon said triac receiving the switching signal from said gating circuit and upon the other half cycle of said one of said AC power sources said triac being placed in a state of conduction thereby providing current to the gate of said other SCR thereby turning on said other SCR and completing an energization circuit between said load and said one of said AC power sources.

6. Apparatus according to claim 4 further including a driver circuit connected intermediate said sensing means and said plurality of isolation means, said driver circuit receiving said electrical output signal from said sensing means and amplifying said electrical output signal to the current density required to drive all of said plurality of isolation means and applying the amplified electrical output signal to said plurality of isolation means.

7. Apparatus according to claim 6 further including time delay means connected intermediate said sensing means and said driver circuit, said time delay means removing said electrical output signal from said driver circuit at a predetemined time after the cessation of said movement of said object within said prescribed area.

8. Apparatus according to claim 7 wherein said time delay means are variable time delay means and wherein said variable time delay means include an integrator circuit and a variable threshold comparator circuit having two inputs and wherein said integrator circuit is connected to one of the inputs of said variable threshold comparator circuit and wherein a variable electrical signal is applied to the other of the inputs of said variable threshold comparator circuit to provide variable time delay.

* * * * *